Aug. 17, 1965 N. LAING 3,200,609
HEAT EXCHANGE APPARATUS AND AIR CONDITIONER
UNITS INCORPORATING SUCH APPARATUS
Filed April 15, 1964 14 Sheets-Sheet 1

INVENTOR
NIKOLAUS LAING
BY
ATTORNEYS

Aug. 17, 1965 N. LAING 3,200,609
HEAT EXCHANGE APPARATUS AND AIR CONDITIONER
UNITS INCORPORATING SUCH APPARATUS
Filed April 15, 1964 14 Sheets-Sheet 2

INVENTOR
NIKOLAUS LAING
BY
ATTORNEYS

INVENTOR
NIKOLAUS LAING
BY
ATTORNEYS

Aug. 17, 1965    N. LAING    3,200,609
HEAT EXCHANGE APPARATUS AND AIR CONDITIONER
UNITS INCORPORATING SUCH APPARATUS
Filed April 15, 1964    14 Sheets-Sheet 4
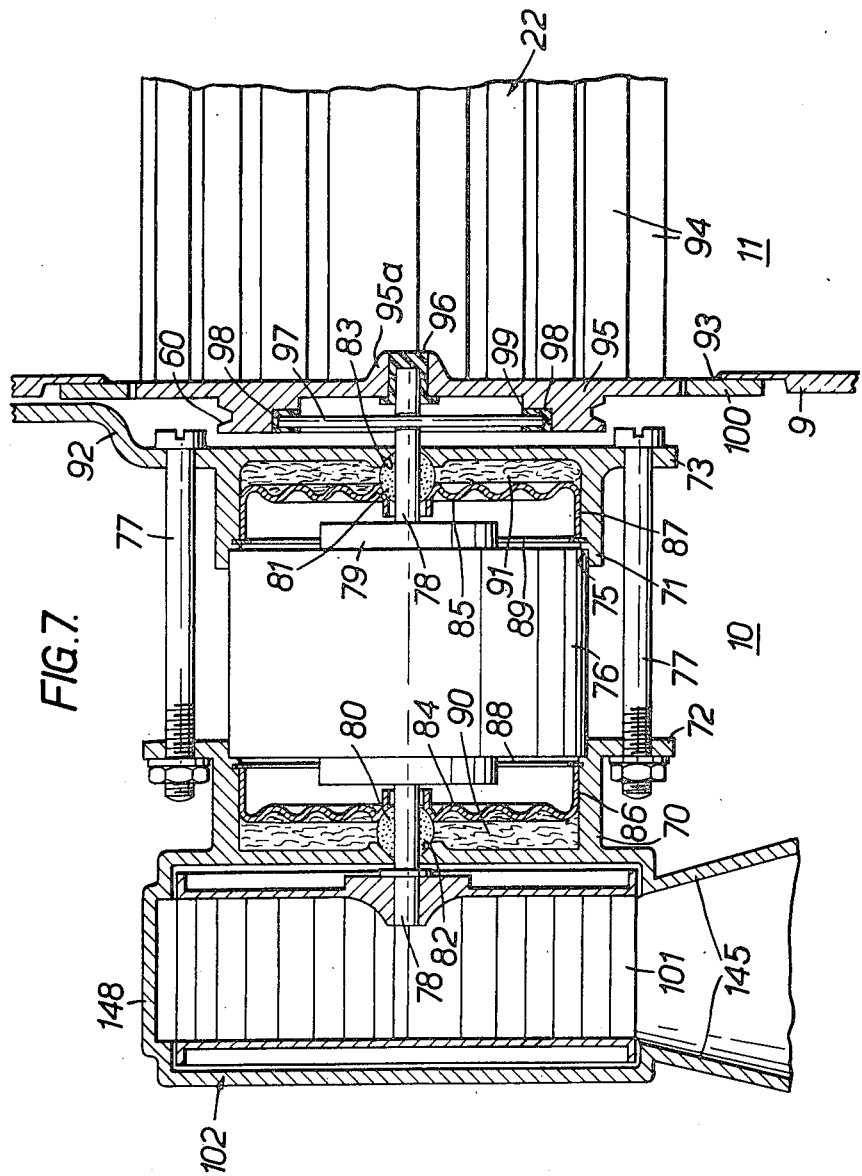
INVENTOR
NIKOLAUS LAING
BY
ATTORNEYS

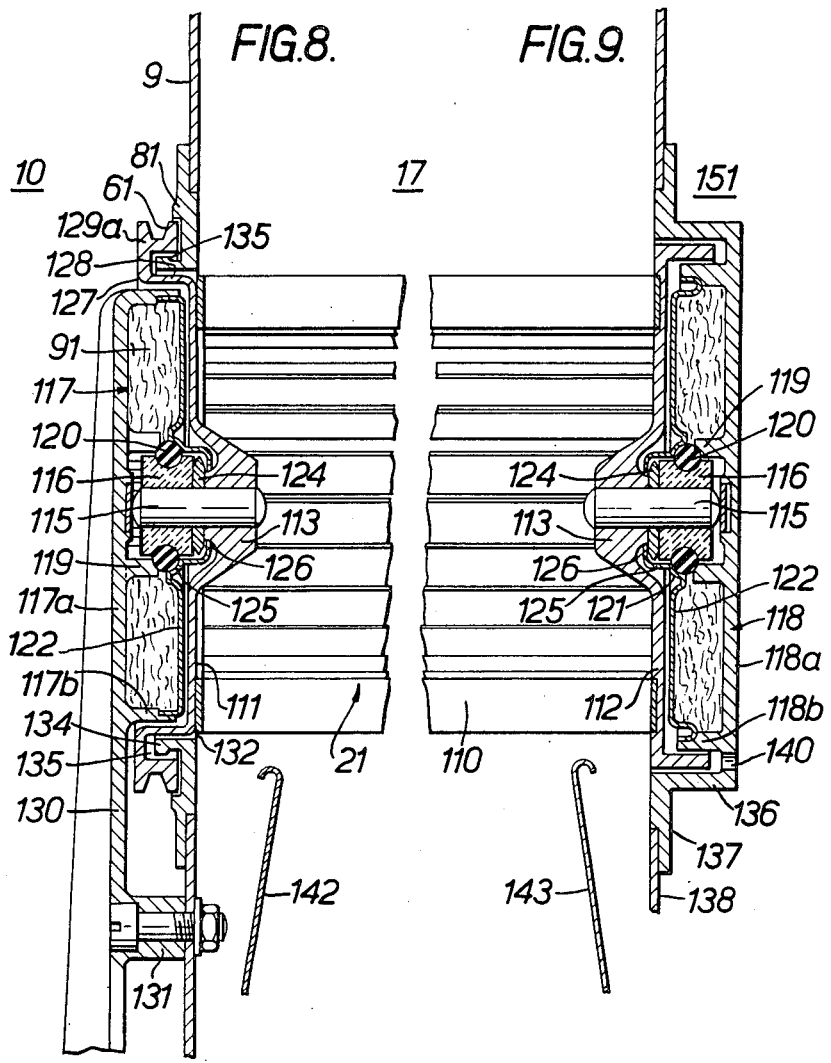

INVENTOR
NIKOLAUS LAING
ATTORNEYS

INVENTOR
NIKOLAUS LAING
BY
ATTORNEYS

Aug. 17, 1965 N. LAING 3,200,609
HEAT EXCHANGE APPARATUS AND AIR CONDITIONER
UNITS INCORPORATING SUCH APPARATUS
Filed April 15, 1964 14 Sheets-Sheet 10

INVENTOR
NIKOLAUS LAING
BY
ATTORNEYS

Aug. 17, 1965 N. LAING 3,200,609
HEAT EXCHANGE APPARATUS AND AIR CONDITIONER
UNITS INCORPORATING SUCH APPARATUS
Filed April 15, 1964 14 Sheets-Sheet 13

INVENTOR
NIKOLAUS LAING
BY
ATTORNEYS

United States Patent Office

3,200,609
Patented Aug. 17, 1965

3,200,609
HEAT EXCHANGE APPARATUS AND AIR CONDITIONER UNITS INCORPORATING SUCH APPARATUS
Nikolaus Laing, Aldingen, near Stuttgart, Germany, assignor, by mesne assignments, to Laing Vortex, Inc., New York, N.Y.
Filed Apr. 15, 1964, Ser. No. 360,053
39 Claims. (Cl. 62—280)

This invention relates to heat exchange apparatus incorporating a heat exchanger block and a blower to pass air therethrough: the invention relates more particularly but not exclusively to room air conditioner units incorporating such apparatus. This application is a continuation-in-part of my earlier application Serial No. 132,757 filed August 21, 1961.

The optimum combination of heat exchanger block and blower—that is the smallest block combined with the lowest power consumption by the blower—is obtained when the air velocity is uniform over the block. This uniform velocity is not easily achieved, at least by hitherto conventional means. A propeller, or axial-flow, blower produces an annular flow which cannot be mated economically with a rectanglar block, which is the only form of block which can readily be produced. Propeller fans have other drawbacks, notably high noise levels and, in their cheaper forms, poor efficiency. Centrifugal blowers can in general be combined with rectangular heat exchanger blocks only by special ducting which causes loss of energy in the air flow and normally does not give uniform velocity over a rectangular block. Moreover such blower and ducting are awkward in size and shape in part at least because the blower axis must in general lie at right angles to the plane of the block.

A basic object of the invention is to provide heat exchange apparatus, incorporating a rectangular heat exchanger block and a blower to pass air therethrough, which apparatus is more compact and efficient than the arrangements discussed above.

The invention in one broad aspect thereof is based on the concept of inducing the air flow through the heat exchanger block by means of a cross-flow blower disposed opposite thereto having its rotor parallel to one side edge of the block, the blower being such as to turn the air flow through an angle exceeding 90° between inlet and outlet areas disposed both on the same side of the apparatus. The air may thus be made to flow through the heat exchanger over substantially the whole area thereof; flow between inlet and outlet may be made to take place at least approximately in planes perpendicular to the rotor axis, the deflection of flow in such planes occurring at least to a large extent within the rotor and without the energy losses associated with ducting. It will be appreciated therefore that apparatus according to the invention can be made to operate very efficiently. At the same time, because the apparatus has the inlet and outlet areas both at one side thereof it may be made very compact: in its simplest form a pair of end walls and a rear wall interconnecting them are all that is required by way of ducting and the whole construction can be simply and cheaply manufactured.

A cross-flow blower as above mentioned comprises a bladed cylindrical rotor and guide means co-operating with the rotor on rotation thereof to induce a flow of air from a suction side of the rotor through the path of the rotating blades to the interior of the rotor and thence again through the path of the rotating blades to a pressure side of the rotor. However not all cross-flow blowers will necessarily produce in the rotor the change of flow direction which the invention (as so far disclosed) requires.

For the present invention it is strongly preferred to adopt a special form of cross-flow blower wherein the rotor and guide means co-operate to set up a vortex of Rankine type having a core parallel to but eccentric of the rotor axis: the vortex field guides the flow in the desired curved path. In this form of crossflow blower the guide means is wholly external of the rotor, and the rotor interior is clear of interior guides, and preferably without obstruction of any kind.

In the apparatus according to the invention, as defined in the penultimate paragraph, the heat exchanger can be on the inlet side only of the cross-flow blower, or on the outlet side only; alternatively the heat exchanger and blower can be arranged for flow from the inlet area to the blower through one part of the heat exchanger, and from the blower to the outlet through the other part of the heat exchanger. The inlet and outlet areas may be separated in space from the heat exchanger. However the inlet area, or the outlet area, may be constituted by the frontal area of the heat exchanger itself, or the frontal area may provide both inlet and outlet areas.

An important further appreciation underlying the invention in a preferred form thereof is that the rotor of the cross-flow blower may advantageously be located opposite one side edge of the heat exchanger; the rear wall of the apparatus may then define with the end walls and the heat exchanger and air circulation space which is wider at said one side edge, where it contains the rotor, than at the opposite side of the block. Not only is this very approximately triangular circulation space conducive to efficient air flow through the block (especially having in mind the flow-turning characteristics of the blower) but it also provides a particularly compact form of apparatus leading to its advantageous adoption in room air conditioner units, as will be seen.

A room air conditioner unit, as the term will be used herein, comprises two heat exchanger blocks co-operating with a compressor to form a refrigerator wherein one block forms the condenser and the other the evaporator, air from a room to be cooled being circulated by one blower through the evaporator and air from the outside atmosphere being circulated by another blower through the condenser to get rid of waste heat. By the use of reversing valves the unit can be made to transmit heat to the room. It has been common in the past to use a centrifugal blower for the evaporator and an axial-flow blower for the condenser. In order that the unit should not be of inordinate size the air passages have been kept somewhat restricted. In prior art units the air has normally been subjected to several accelerations, decelerations and changes of direction with the result that the total resistance is greater than the resistance necessary for the exchange of heat. This is a disadvantage as regards energy consumption and even more so as regards the noise produced by the blower. In addition, air conditioner units take up a great deal of space and are expensive and difficult to install. In particular they must usually be protected from the weather since their depth is several times greater than the depth of the walls in which they are normally placed. It is also difficult to sound-proof these prior art units to prevent the penetration of traffic noise into the room which the unit is to cool.

The general object of the invention, insofar as it relates specifically to room air conditioner units, is to minimize these disadvantages: more particularly the invention aims to provide a room air conditioner unit which satisfies the following conditions:

(1) Resistance to air flow to be reduced to a minimum, so that noise production and energy consumption are also at a minimum;

(2) Dimensions to be reduced to a minimum so that both size and cost are reduced;

(3) Depth of the device to be reduced to a value which approximately corresponds to the width of the wall, so that weather-proofing problems are minimized; and (4) Optimal sound-proofing to be achieved to prevent the penetration of traffic noise.

In its broadest aspect the invention, as applied to room air conditioner units, provides such a unit comprising two heat exchanger block/cross-flow blower combinations as discussed above, and a compressor co-operating with the heat exchanger blocks to form a refrigerator wherein one block forms the condenser and the other the evaporator, one heat exchanger block/blower combination circulating cooled air to the room and the other circulating air from the outside to get rid of waste heat. These two heat exchanger/blower combinations can be arranged in various ways, such as back-to-back or side by side.

In a preferred form of room air conditioner unit, however, the unit is in the shape of a block having a pair of opposite sides to face one towards the room and the other towards the exterior, and comprises refrigeration apparatus having a pair of rectangular heat exchanger blocks disposed in spaced and substantially parallel relation one adjacent either of said sides and forming evaporator and condenser respectively, partition walling extending obliquely through the height of the unit between the heat exchanger blocks and defining with each an air circulation wider adjacent one edge of the heat exchanger block than adjacent the opposite edge thereof, the wider part of one circulation space being adjacent the narrower part of the other circulation space, and a crossflow blower in the wider part of each circulation space each such blower including a bladed cylindrical rotor mounted with its axis parallel to the adjacent edge of the block and extending over the greater part of its length.

As will be appreciated these very approximately triangular circulation spaces enable an interfitting or telescoping, as it were, of the two heat exchanger block/cross-flow blower combinations with a corresponding reduction in the depth of the unit between its opposite sides. For one such heat exchanger/blower combination the inlet and outlet areas will both be at the room side of the unit, and for the other such combination at the side of the unit facing the exterior. In both cases, as above described, flow between inlet and outlet takes place at least approximately in planes perpendicular to the rotor axis, the deflection of flow in such planes occurring preferably within the rotor by reason of the vortex there generated: thus it will be seen that flow occurs with minimum noise and energy loss; this reduction of energy loss permits the use of a blower rotor of relatively small size and low speed, which will be particularly important at the room side to further reduce noise entering the room. The partition walling may be made to provide the main contribution to sound insulation to prevent the penetration of traffic noise.

The invention will be further described with reference to the accompanying drawings in which various embodiments of the invention are illustrated by way of example. In the drawing:

FIGURE 7 is a longitudinal section of the driving motor for the blowers of the unit showing the mounting of the motor and a portion of one blower rotor together with certain other parts which it drives;

FIGURE 8 is a longitudinal section, partly broken away, of the other blower rotor and the means whereby the driven end thereof is rotatably mounted;

FIGURE 9 is a section similar to that of FIGURE 8 but showing how the non-driven end of the rotor is mounted;

Figure 1:
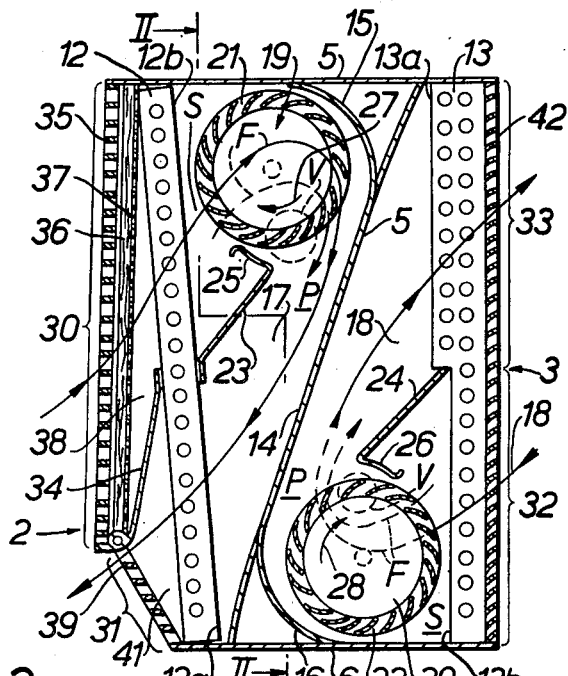
FIGURE 1 is a vertical transverse section through a first form of room air conditioner unit taken on the line I—I of FIGURE 2.
Figure 2:
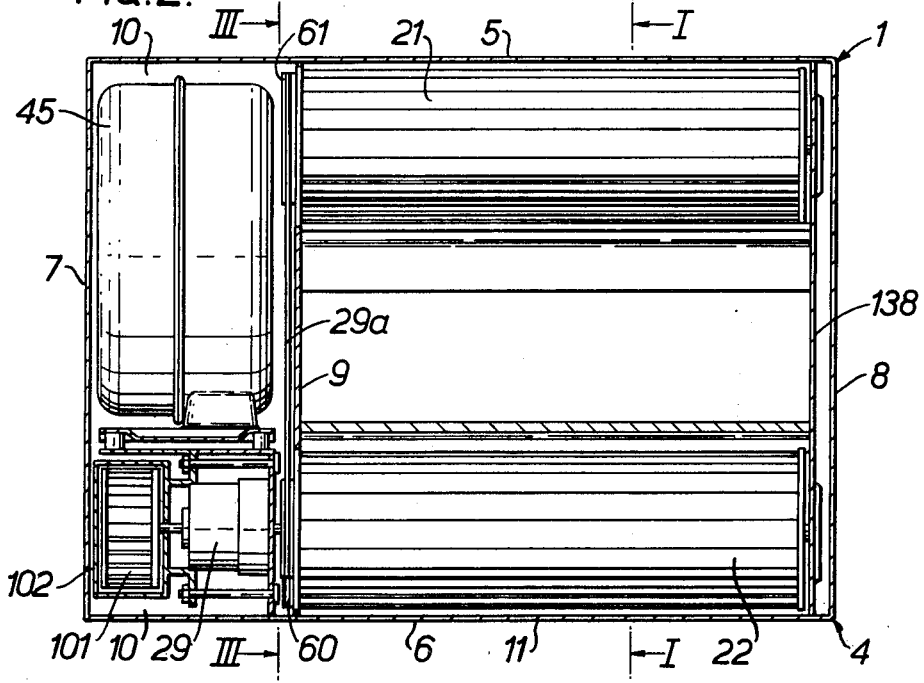
FIGURE 2 is a vertical longitudinal section of the unit taken on the line II—II of FIGURE 1.
Figure 15:
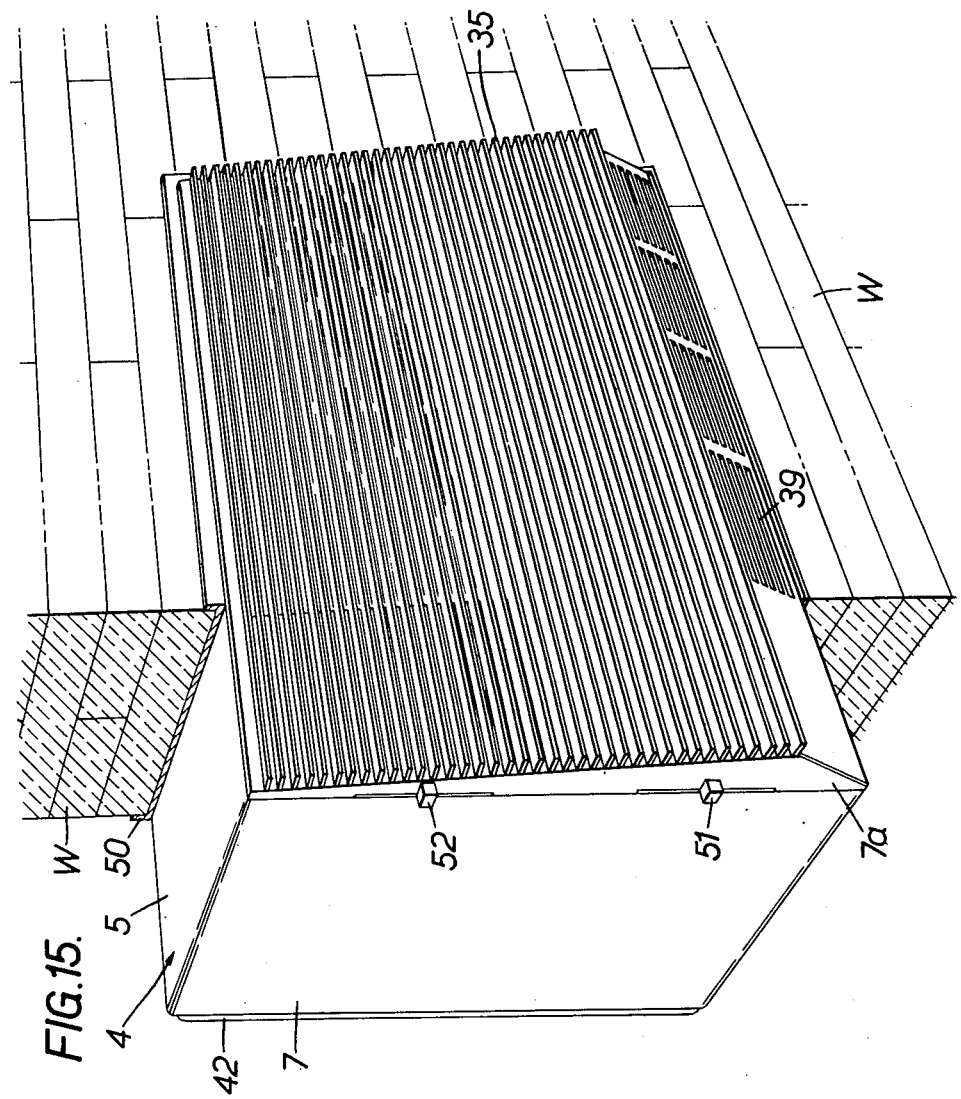
FIGURE 15 is a perspective view showing the unit installed in the wall of a room.

Referring first to FIGURES 1 and 2 the room air conditioner unit there shown has the form of a block 1 having a pair of opposite sides 2, 3 which on installation of the unit (as seen in FIGURE 15) are directed respectively toward the room and towards the exterior. A rectangular casing 4 provides horizontal top and bottom walls 5, 6, vertical end walls 7, 8 and a vertical partition wall 9 parallel and close to the end wall 7 which divides the block 1 into a smaller and a larger compartment which compartments are designated respectively 10, 11. Rectangular heat exchanger blocks 12, 13 are disposed in the larger compartment 11 at either side of the block: both heat exchanger blocks 12, 13 extend over the whole area of the compartment as defined between the horizontal walls 5, 6 and the vertical walls 8, 9. The heat exchanger block 12 is slightly inclined downwardly and inwardly; the heat exchanger block 13 is vertical and of double thickness for the top half of its height. A partition wall 14 extends obliquely through the larger compartment 11 from the lower inside edge 12a of the heat exchanger block 12 to the upper inside edge 13a of the heat exchanger block 13. Curved wall portions 15, 16 provide fairings between the partition wall 14 and the upper and lower casing wall 5, 6 respectively. The partition wall 14 and fairing 15 and a portion of the upper wall 5 define with the heat exchanger block 12 an air circulation space 17 which as seen in section of FIGURE 1 has the approximate shape of a narrow triangle with its apex downedward. The partition wall 14, fairing 16 and a portion of the lower wall 6 define with the heat exchanger block 13 another air circulation space 18 completely separate from the first and also approximately triangular in section with its apex upward.

Within each air circulation space 17, 18 at the wider part thereof is disposed a cross-flow blower designated generally 19, 20 respectively and comprising a blade cylindrical rotor 21, 22 extending adjacent and parallel to one horizontal edge 12*b*, 13*b* of the respective heat exchanger block 12, 13 and guide means co-operating with the rotor but well spaced therefrom. Each blower rotor 21, 22 is substantially equal in length to the respective edge 12*b*, 13*b*. In each blower 19, 20 the guide means comprises a guide wall 23, 24 extending towards the respective rotor 21, 22 from half-way in the height of the adjacent heat exchanger block 12, 13 and terminating in a portion 25, 26 return-bent towards the heat exchanger and defining with the rotor 21, 22 a gap: in the construction illustrated this converges slightly with the rotor in the direction of rotation thereof shown by the arrow 27, 28 but the gap may instead be parallel. The guide means further includes the adjacent fairing wall portion 15, 16 on the side of the rotor 21, 22 opposite of the respective return-bent guide wall portion 25, 26. The rotors 21, 22 are entirely without interior obstruction in the construction illustrated, through a shaft of small diameter can be used at the cost of some loss of efficiency. The rotors 21, 22 are driven in the directon of the arrows 27, 28 by means of a motor 29 located in the smaller compartment 10; the motor drives the rotor 22 direct and the rotor 21 by means of a belt 29*a*, as will be further described below. In operation, the rotors 21, 22 co-operate with their respective guide means to set up a vortex having a core region, indicated at V, which interpenetrates the path of the rotating blades of the rotor adjacent the guide wall portions 25, 26. Air is induced to pass from a suction region S through the path of the rotating blades of the rotor to the interior thereof and thence again through the path of the rotor blades to a presure region P: by reason of the vortex flows takes place along flow lines, indicated at F which are strongly curved about the vortex core region V to the extent that, in passing through the rotor, the major part of the flow undergoes a change in direction well in excess of 90°. Each cross-flow blower 19, 20 thus draws air through one half of the respective heat exchanger block 12, 13 into the suction region S of the air circulation space 17, 18 in which the blower is situated; the air passes twice through the path of the rotating rotor blades, as described, and is then discharged through the other half of the heat exchanger block. Since each rotor 21, 22 is equal in length to one side edge of the respective heat exchanger block 12, 13 the air flow through the block and through the associated air circulation space takes place substantially along planes which are perpendicular to the rotor axis and to the plane of the heat exchanger block, and the change in flow direction occurs mainly in the rotor, due, as explained, to the vortex.

For each heat exchanger block 12, 13, the inlet and outlet areas, designated respectively 30, 31 and 32, 33 are on the same side.

A flow guide wall 34 extends downwardly from the heat exchanger block 12 opposite the guide wall 23 and forms a continuation of this wall. At its lower edge the wall 34 pivotally mounts a grille 35 holding a filter 36 against an apertured backing member 37 spaced from the adjacent surface of the heat exchanger block 12 and defining therewith an inlet space 38. Forward pivoting of the grille 35 enables the filter 36 to be cleaned or changed. The downwardly extending wall 34 enables the inlet area 30, defined by the grille 35, to be much larger than the area of the heat exchanger block 12 through which air enters the circulation space 17, thus minimizing the resistance of the filters 36, which as will be understood, extends over the whole of the inlet area. A series of horizontal louvers 39 extend over the outlet area 31, defined between the lower edge of the guide wall 34 and the front edge of the bottom casing wall 6. Air leaving the blower 19 flows between the guide wall 23 and partition wall between which it passes, and since these diverge the air pressure increases and its velocity diminishes. After traversing the lower half of the heat exchanger block 12 the air velocity is increased in the outlet space 41 between the block and the louvers; guided by the louvers the air issues more or less in a horizontal jet of considerable carrying power. The flow in this jet will be substantially laminar and hence physiologically more pleasant to the occupants of the room than a turbulent jet.

The inlet and outlet areas 32, 33 for the heat exchanger block 13 consist simply of the lower and upper halves of its total area, over which extend a series of louvers 42. Air leaving the cross-flow blower 20 is subjected to a pressure increase due to the divergence of the guide wall 24 and the partition wall 14, and this assists the air to traverse the double-thickness upper part of the heat exchanger block. The louvers 42 direct the emergent air upwardly to minimize the chance of its being sucked back into the inlet.

A motor-driven compressor 45 within the smaller compartment 10 of the block is connected with the heat-exchanger blocks 12, 13 to form a refrigeration apparatus wherein the block 12 is an evaporator and the block 13 a condenser. Thus on the room side of the unit, room air is passed through the filter 36, cooled in passage twice through the block 12 and returned to the room. Rejected heat is dissipated to the exterior atmosphere by the block 13; the thickness of its upper part is doubled because the temperature differential may be relatively small.

It is emphasized that the apparatus comprising one or other heat exchanger block 12 or 13, its respective cross flow blower 19 or 20 and associated end and rear walling (comprising parts of walls 8, 9 and walls 14 and either 15 and 5 or 16 and 6) can find many useful applications apart from the air conditioner unit herein described. This heat-exchanger block/crossflow blower combination effectively uses the whole area of the block, by means of a blower which need only impart such energy as is needed for passage through the block, by contrast with prior art arrangements where the blower has also to drive the air through tortuous or confined passageways. The apparatus is moreover compact partly because of the arrangement of the blower closely opposite and parallel to one side edge of the heat exchanger block and the generally triangular-section air circulation space, and partly because the depth of the blower itself can be fairly small.

All these advantages are exploited in the room air conditioner unit described. Because of the triangular-section air circulation space, the two heat exchanger block/cross flow blower combinations can be arranged back to back to take up little more than the depth of one alone. The efficiency of the flow pattern reduces noise, and the reduced blower power required allows for a further noise reduction. The partition wall 14 enables effective sound-insulation against transmission of sheet noises: further measures to this end will be described below.

As will be seen from FIGURE 15, the room air conditioner unit above described can readily be installed in a rectangular aperture in a wall W, preferably after providing the aperture with a sheet-metal lining 50. Because the depth of the unit is small the louvers 42 may be brought approximately flush with the outer surface of the wall so that the unit will need no special protection from the weather and will not look unsightly. On the room side of the wall W the grille 35 projects slightly together with corresponding portions of the vertical walls 7, 8, 9. The exposed portion 7*a* of the end wall 7 carries a thermostat control knob 51 and a further control knob 52 for regulating the amount of fresh air to be introduced into the room: the means by which fresh air is introduced will be discussed later.

The room air conditioner unit described can of course be installed in other places besides in a wall: thus it may be installed in a window, where its moderate depth is also an advantage.

Figure 3:
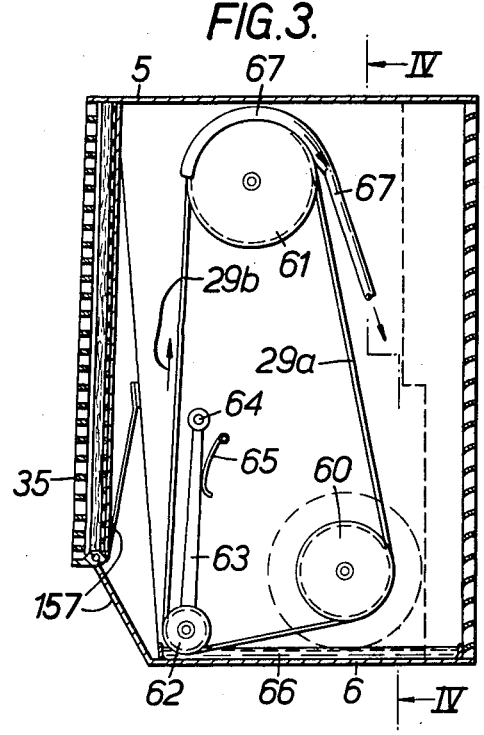
FIGURE 3 is a vertical transverse section through the unit, taken on the line III—III of FIGURE 2.

It has been explained with reference to FIGURES 1 and 2 that the blower rotors 21, 22 are driven by a motor 29, the rotor 22 directly and the rotor 21 by a belt 29a: the arrangement of this belt is shown in FIGURE 3. The belt 29a is trained over a driving pulley 60 which forms a part of one end member of the rotor 22 and over a driven pulley 61 which forms a part of the corresponding end member of the rotor 22. The belt 29a driven in the direction of the arrows 29b and tensioned by means of an idler pulley 62 rotatably mounted upon a lever 63 pivotally supported at 64 and acted upon by a spring 65. It will be seen that the driven pulley 61 is of smaller diameter than the driving pulley 60, so that the rotor 21 on the room side of the unit rotates at a lower speed than the rotor 22. As will be appreciated any noise produced by the rotor 21 is transmitted directly to the room, so that this rotor should rotate at the lowest speed consistent with the duty it has to perform. Noise from the rotor 22 is rejected to the exterior and cannot enter the room by reason of the partition wall 14, so that the rotor 22 can be run at any desired speed. Since, as already observed, the temperature differential at the condenser heat exchanger block 13 will generally be less than that at the evaporator block 12, a greater speed for the rotor 22 is desirable.

Figure 4:
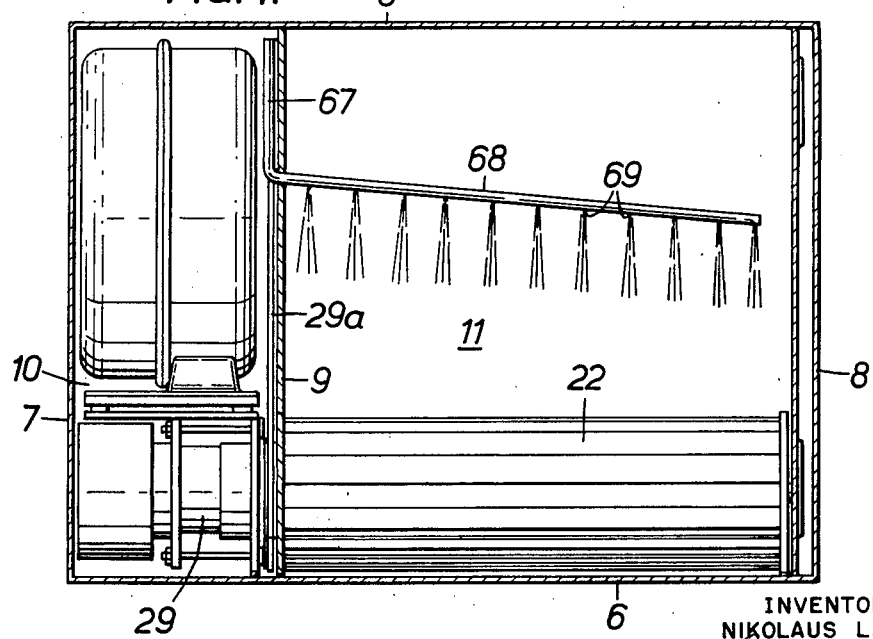
FIGURE 4 is a vertical longitudinal section of the unit taken on the line IV—IV of FIGURE 3.
Figure 5:
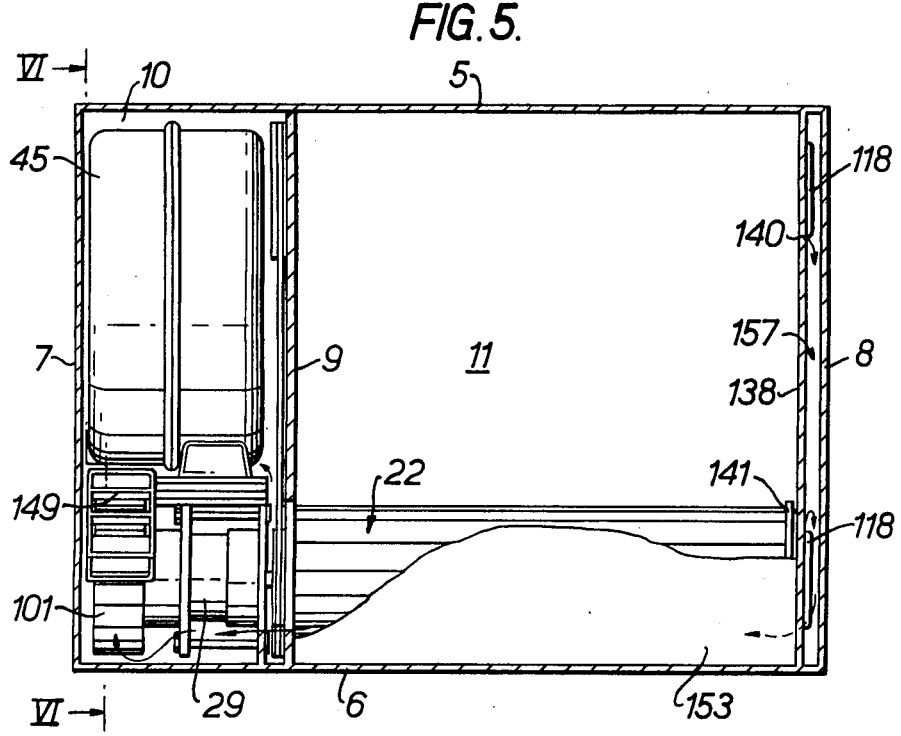
FIGURE 5 is a further vertical longitudinal sectional view of the unit taken on the line V—V of FIGURE 6, wherein a blower rotor and a fairing wall portion are partially cut away to show a duct behind them.
Figure 6:
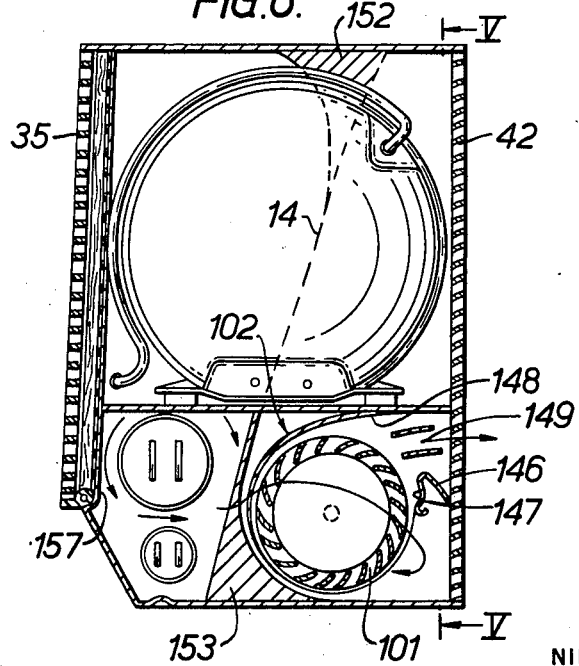
FIGURE 6 is a further vertical transverse section of the unit taken on the line VI—VI of FIGURE 5.
Figure 10:
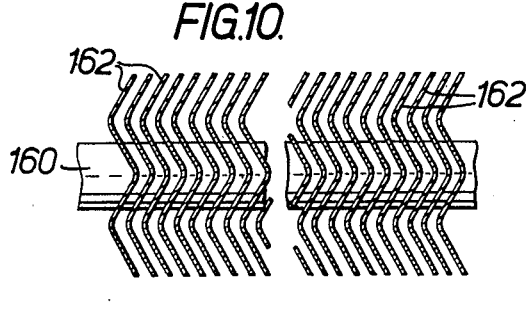
FIGURES 10 to 13 are partial sectional views illustrating different features of heat exchangers forming part of the air conditioner unit.
Figure 11:
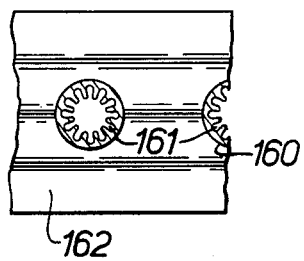

One of the problems encountered with room air conditioner units is the disposal of the water which condenses on the evaporator. In the unit of FIGURES 1 to 15 this problem is solved by providing a sump 66 (FIGURE 3) for this water in the bottom of the smaller compartment 10 of the block and locating the idler pulley 62 so that the belt 29a passes through the sump on its way up to the driven pulley 61. The belt 29a, which is preferably of round cross-section and of fibrous material, picks up water from the sump 66 and carries it to the driven pulley 61 where it is flung off by centrifugal force against a splash-guard 67 placed around the pulley and led by the splash-guard into a duct 68 (FIGURE 4) extending with a gentle downward slope through the pressure region P of the air circulation space 18. The duct 68 is pierced at intervals with holes 69 through which the water drops: this water falls upon the blades of the blower rotor 22 and is broken into tiny droplets which are then carried off in the warm air stream passing from the blower to the evaporator heat exchanger block 13. Some of the droplets collect on the block 13 and improved the heat dissipation therefrom by their evaporation. Excess water collected on the block 13 returns to the sump 66.

FIGURE 7 shows the mounting of the motor 29 and of the rotor 22 directly driven thereby. The motor 29, which is of the A.C. induction type, comprises a pair of end members 70, 71 in the form of inwardly facing cups with outwardly extending flanges 72, 73. The end members 70, 71 provide shoulders 74, 75 which receive and locate the stack 76 of laminations forming the poles of the motor. Bolts 77 interconnect the flanges 72, 73 of the end members 70, 71 and clamp these members together about the lamination stack 76. The motor shaft 78, which carries the motor armature 79, is rotatably supported from the end members 70, 71 through self-aligning bearing bushes 80, 81 of sintered material and spherical exterior formation. The bushes 80, 81 are urged into axially disposed seating recesses 82, 83 of complementary shape in the end members 70, 71 by means of annularly corrugated retainer elements 84, 85 of resilient sheet material each having a central portion in contact with the respective bush and an axial flange 86, 87 engaged within the respective end member and located in position by a circlip 88, 89. Each retainer element 84, 85 also holds against the respective end member 70, 71 a wad 90, 91 of fibrous material saturated with lubricating oil and surrounding the corresponding bush 80, 81 to form an oil store therefor.

The motor end member 71 has an integral extension in the form of an arm 92 which projects upwards close to the vertical partition wall 9 and is secured thereto by means not shown.

The motor shaft 78 extends through a wide circular aperture 93 in the partition wall 9 and mounts one end of the rotor 22. The rotor comprises a series of blades 94 arranged in a ring and supported between a pair of end members of which only one, designated 95, is shown in the figure. This end member 95 has the form of a disc located within the aperture 93 in alignment with partition wall 9 and having an integral annular extension within the compartment 10 providing the pulley 60 previously described. The end member 95 has a centrally apertured boss 95a receiving a soft rubber bushing 96 into which one end of the motor shaft 78 projects so that the bushing is compressed between the shaft and the boss. A pin 97 extends through a radial bore in the shaft 78 and has its ends seated against soft rubber blocks 98 received in radial recesses 99 in the annular extension forming the pulley. Thus the rotor 22 is supported on the motor shaft 78 in a manner permitting, by reason of the elastic bushing 96, minor misalignment between their respective axes: the shaft drives the rotor through the pin 97 which can also accommodate such misalignment. Thus despite the length of the rotor 21 the bearings therefor will not seize or impose undue braking torque should the alignment thereof become slightly upset through distortion of the casing 4 e.g. on installation or transport: moreover it is unnecessary to take special precautions to secure alignment on assembly, and a cheaper construction becomes possible.

A sealing ring 100 fixed to the partition wall 9 about the aperture 93 therein closely surrounds the end member 95: this ring is finally secured in position after assembly of the motor 29 and rotor 22.

The end of the motor shaft 78 opposite the rotor 22 supports rigidly in overhung fashion a cylindrical bladed rotor 101 of short axial length. The motor end member 70 is formed integrally with a casing 102 enclosing the rotor 101. The rotor 101 and casing 102 therefor will be further described hereafter.

The non-driven end of the rotor 22 (not illustrated in FIGURE 7) is supported in the manner described with reference to FIGURE 9 for the non-driven end of the rotor 21.

The mounting of the rotor 21 is illustrated in FIGURES 8 and 9. Like the rotor 22 this rotor 21 comprises a series of blades arranged in a ring and supported between end supports, the blades and end supports being here designated 110, 111 and 112 respectively. However, unlike the rotor 22, the rotor 21 delivers air to the room and it is therefore necessary to minimize noise transmission into the air circulation space where the rotor 21 is situated and maximize efficiency so that the rotor can be run as slowly as possible whereby to generate least noise. These requirements dictate certain special features of the rotor mounting, as will be seen from the following detailed description thereof.

Both the rotor end members 111, 112 are basically discs each with an inwardly directed boss 113 carrying an outwardly projecting stub shaft 115. Each stub shaft 115 is received in a bearing bush 116 formed of sintered material. The bearing bushes 116 are flexibly mounted within fixed bearing support members 117, 118 which are of shallow cup-like formation, each having a flat bottom 117a, 118a and a rim 117b, 118b. A series of projections 119 arranged in a ring about the rotor axis extend from each of the bearing support members 117, 118 and surround the outer end of the respective bush 116 in slightly spaced relation thereto. Each bush 116 is formed with an annular groove midway between its ends which locates on O-ring 120, and this O-ring is clamped between the projections 119 and a central annular portion 121 of a centrally apertured retainer disc 122 of resilient sheet metal the outer periphery of which is secured to the rim 117b, 118b of the respective bearing support members 117, 118. By these means the bearing bushes 116 are able to move slightly to accommodate minor misalignment of the stub shafts 115 or of the bearing support members. Thus, as with the mounting of the rotor 22 there is no need to take special precautions to establish and maintain perfect alignment.

An annular wad 123 of lubricant-soaked fibrous material fills the space between each bearing support member 117, 118 and the associated bearing bush retainer disc 122 to provide a store of lubricant for the bush 116, the lubricant reaching the bush through the spaces between the projections 119. Any lubricant thrown off the extreme end of each stub shaft is returned direct to the wad 123: a splash ring 124 is mounted on each stubshaft 115 between the bush 116 and the boss 113 of the respective rotor end members 111, 112 and oil leaking from the bush in the direction of the rotor is thrown off by the splash ring against a tubular extension 125 of the central portion 121 of the retainer disc 122 which extension surrounds the splash ring and has an inturned lip 126 on the rotor side thereof, the lip and extension guiding the oil back to the wad 123.

The rotor end member 111 carries at its periphery a flange 127 having laterally and radially outwardly directed portions 128, 129 respectively, the latter portion 129 being formed integrally with a ring 129a extending laterally inwardly thereof and providing the pulley 61 previously referred to. The plane containing the belt 29a (see FIGURES 3 and 4) passing over this pulley 61 intersects the bearing bush 116 at about midway between its ends, so that belt tension does not introduce undesirable bending movements in the assembly. The bearing support member 117 has an integral extension in the form of an arm 130 which projects downwardly close to the partition wall 9, and is secured thereto at 131: this arm 130 may form a continuation of the arm 92 by which the motor 29 is supported. By mounting the bearing support member 117 and motor 29 solely on the arms 130, 92 it becomes possible to assemble the belt 29a over the pulleys 60, 61, or remove it therefrom, without previously dismantling any parts.

The rotor end member 111 is positioned within a circular aperture 132 in the partition wall 9. A ring 133 fixed to the wall 9 about the aperture 132 extends close up to the periphery of the rotor end member 111 and has an outwardly directed annular flange 134 which projects laterally between the ring 129a and the outwardly directed flange portion 128 on the member 111 so that there is formed a narrow tortous annular gap 135 providing the sole communication at this end of the rotor 21 between the compartment 10 and the air circulation space 17 containing this rotor whereby to minimize transmission of noise between them.

Figure 14:
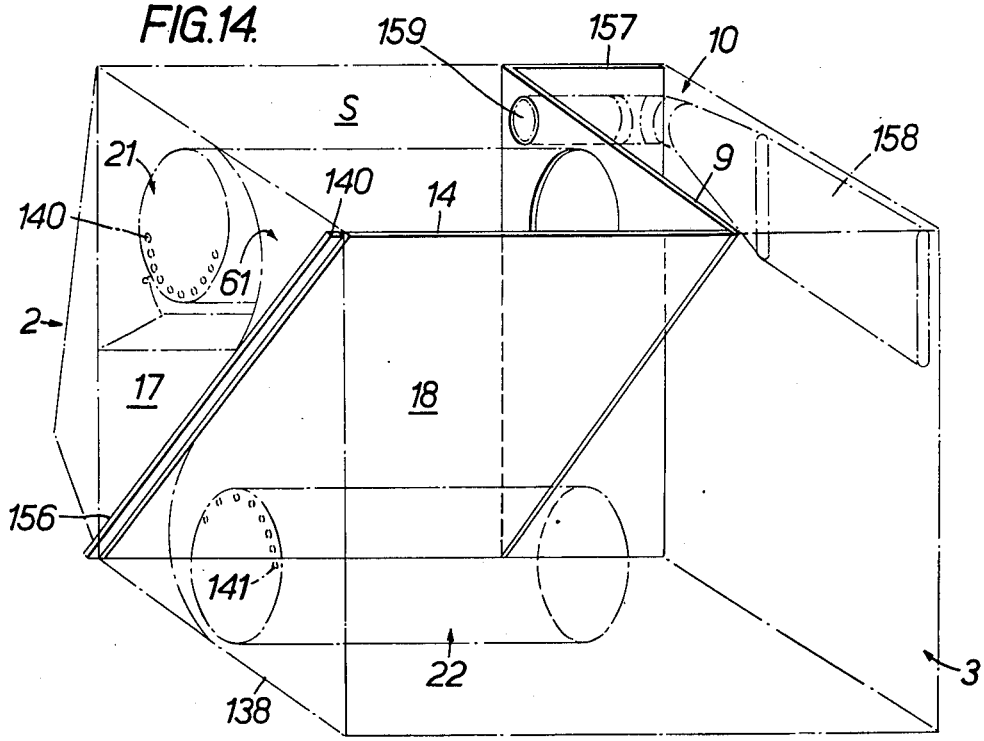
FIGURE 14 is a ghose perspective view of the unit, illustrating the sound-insulating walls of the unit.

The bottom 118a of the bearing support member 118 projects radially outwardly beyond the rim 118b previously mentioned and carries an outer rim 136 with a radially extending flange 137 secured to a wall 138 which is close and parallel to the end wall 8 of the casing 4 (see FIGURE 2). The rotor end member 112 has at its periphery a flange 139 which extends laterally outwardly between the rims 118b, 136 of the bearing support member 118. The bearing support member 118 is formed with holes 140 between the rims 118b, 136 over an arc, as will be best seen in FIGURE 14. It has been explained that the non-driven end of the rotor 22 is also supported in the manner shown in FIGURE 9. For this rotor, too, holes may be provided similar to the holes 140; such holes are shown in FIGURE 14 where they are designated 141. The purpose of these holes 140, 141 is explained below.

As will be seen from FIGURES 8 and 9, the rotor end members 111, 112 and the support means therefor are designed to present, to air flow through the rotor 21, surfaces which (apart from the bosses 113) are flat and flush with the adjacent surfaces of the walls 9, 138 bounding the circulation space 17 at either end of the rotor; as will be understood, the object of this is to minimize disturbance of the air flow at the ends of the rotor. However some disturbance of the air flow at the ends of the rotor 21 may occur despite precautions just mentioned, and it may be desirable to provide auxiliary walls 142, 143 on the pressure side of the rotor which reject flow from immediately adjacent the ends of the rotor: these walls diverge in the direction of flow and merge into the walls 9, 138 at a point downstream.

It will be recalled that the cross-flow blowers 19, 20 operate by the formation of a vortex of Rankine type having a core region which interpenetrates the path of the rotor blades adjacent the guide wall portions 25, 26, as shown in FIGURE 1. Now the core region is a region of low static pressure, so that air will tend to flow into this region from the surroundings through clearance spaces at the ends of the rotor, and thereby impair the vortex and hence the blower efficiency near the ends of the rotor. The air conditioner unit described provides means to counteract this. As already mentioned the blower motor 29 drives a cross-flow rotor 101 within a casing 102 (see FIGURES 5, 6 and 9). This casing 102 provides for the rotor 101 guide surfaces which correspond generally to those associated with the rotors 21, 22: thus the casing includes end walls 145, a guide wall 146 corresponding to the guide walls 23, 24 and having a return-bent portion 147 converging with the rotor, and a second guide wall 148 opposite the wall 146, the walls 145, 146 and 148 defining a diffusing outlet region 149 discharging to the side 3 of the block 1 facing the exterior. The rotor 101 and casing 102 co-operate to form a cross-flow blower designated generally 150 and functioning in the same manner as the blowers 19, 20; no further description of this blower will accordingly be required. Air reaches the rotor 101 from the compartment 10, which communicates with the narrow space 151 between the end wall 8 and the rotor-bearing support wall 138 by the ducts 152, 153 formed between the partition walling 14 and on the one hand the upper casing wall 5 and facing wall portion 15 and on the other hand the bottom casing wall 6 and the facing wall portion 16. In this way the blower 150 sucks air out through the holes 140, 141 into the space 151 and thence through the ducts 152, 153 to the compartment 10, whence the air passes through the blower and discharges to the exterior. In addition certain amount of air is sucked directly into the compartment 10 through the gas around the rotor end members 95 and 111. The air passed through the blower serves to cool the compresser 45 and the motor 29. However, since the air is taken largely from the vortex core regions (shown at V in FIGURE 1) near the ends of the rotors 21, 22, where otherwise air would tend to enter and spoil the vortex, the effect is also to strengthen and stabilize these regions and hence improve the performance of the blowers 19, 20 near the ends of the rotors. It will be appreciated that by rendering the flow through the blowers 19, 20 substantially uniform over their length the efficiency of the heat-exchanger block/blower unit combinations may be correspondingly improved.

The sound insulation arrangement of the room air conditioner unit is shown in FIGURE 14. The partition wall 14 provides complete sound insulation between the air circulation space 18 facing the exterior, and the room side 2 of the unit. This wall 14 has an extension 156 providing a similar partition in the space 151. The small compartment 10 where the compressor 45 and blower motor 29 is situated is insulated from the room side 2 of the unit by an insulating wall 157 at this side of the compartment, and by the portion of the transverse wall 9 between this wall and the partition wall 14.

Chiefly for appearance sake the grille 35 extends over the whole width of the unit between the end walls 7, 8; the wall 157 blocks off flow through the grille over the area opposite the compartment 10.

The various sound-insulating walls have been shown simply as made of sheet metal, but it will be appreciated they may be made of, or lined with, a sound-deadening material.

To introduce fresh air into the room, a flat narrow tube 158 extends from behind the louvres 42 on the exterior side 3 of the unit and through the compartment 10 thereof; in this compartment the tube 158 merges into a round tube 159 leading into the suction region S of the circulation space 17 on the room side 2 of the unit. The blower 19 sucks fresh air through the tubes 158, 159 into this space, where it mixes with air drawn in from the room and is expelled thereto through the lower half of the heat exchanger block 12. A control valve (not shown) in the tube 158 manually controllable by the knob 52 previously referred to provides for regulation of the proportion of fresh air admitted. The tubes 158, 159 are preferably lined with sound-deadening material to inhibit the transmission therethrough of traffic noises from the exterior.

Figure 19:
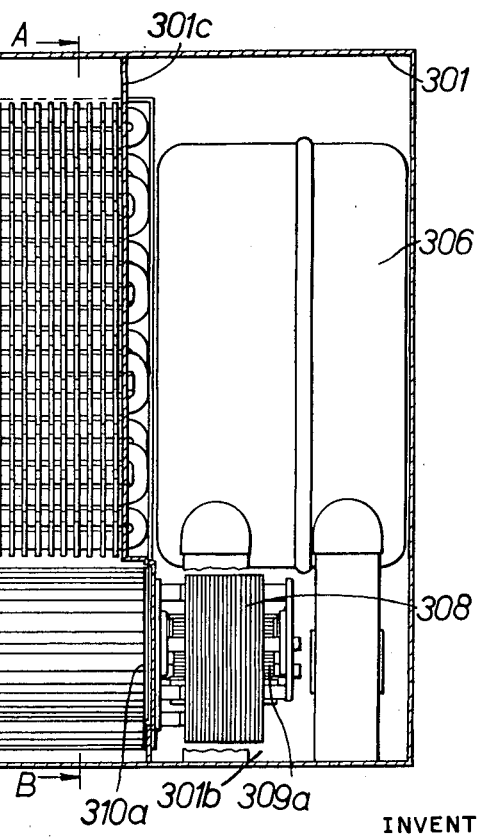
FIGURES 19 and 20 are respectively a longitudinal section and a transverse section of a third form a room air conditioner unit, the transverse section being taken on the line A—B of FIGURE 19.
Figure 20:
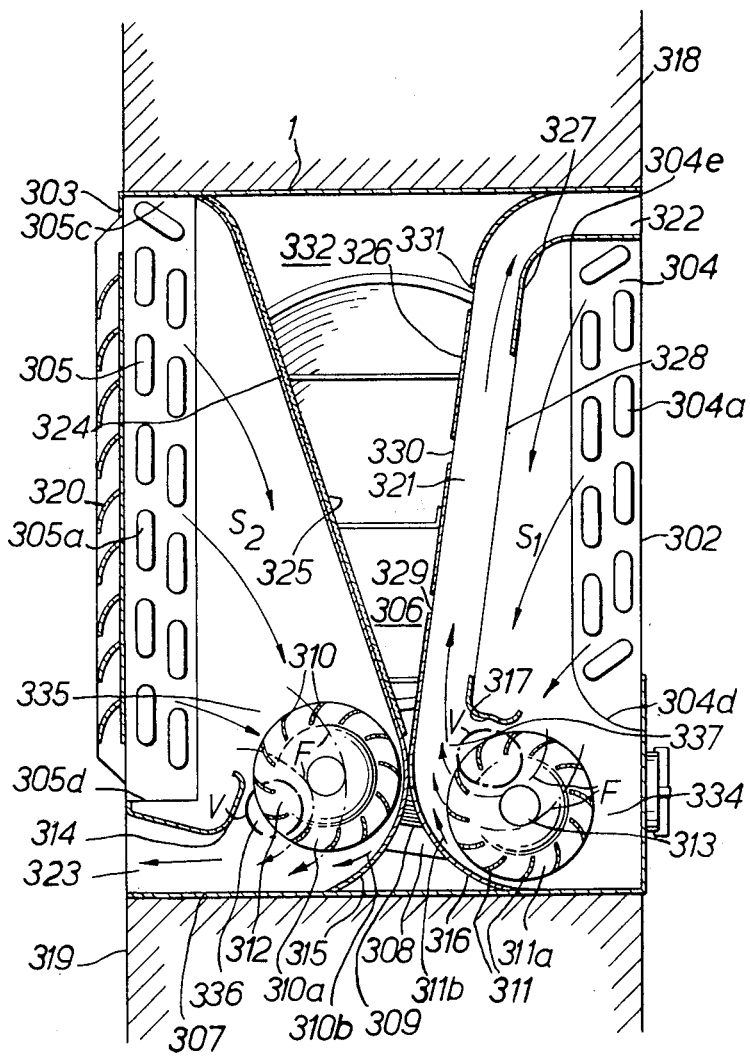
Figure 24:
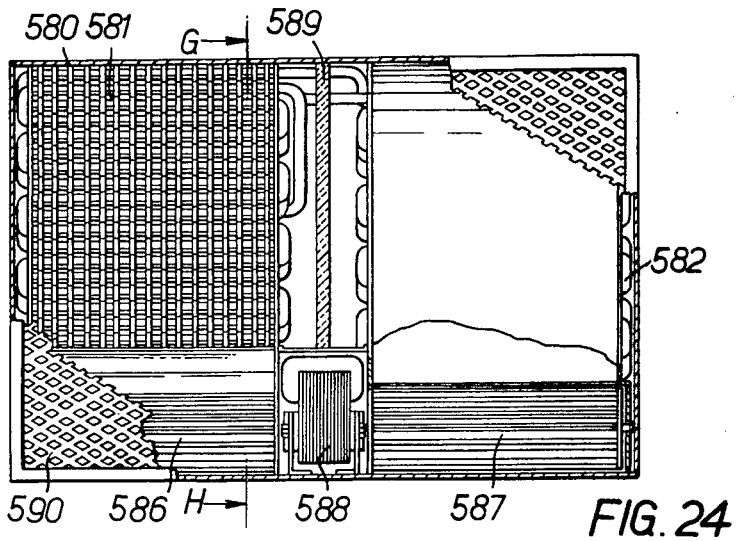

The heat exchanger blocks 12, 13 may be of conventional construction. FIGURES 19 and 20 hereafter referred to show one possible construction. A preferred construction is however shown in FIGURES 10 and 11 where tubing 160 having a bore 161 of stellate section extends through a multiplicity of closely spaced fins in the form of strips 162 of heat-conductive metal which are each corrugated lengthwise. The corrugated strips 162 provide for a more rapid transfer of heat to the air flowing past them than would be the case without the corrguations, whilst the stellate bore 161 ensures a correspondingly rapid heat transfer between the refrigerant and the tubing 160. Instead of forming the tube 160 with a stellate bore 161, a cylindrical bored tube can be used which is provided with an internal wire spiral to improve heat transfer between the refrigerant and the tube.

Figure 12:
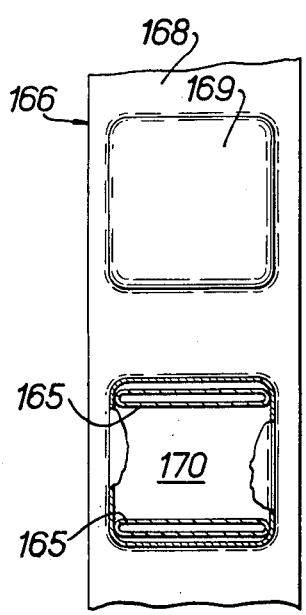
Figure 13:
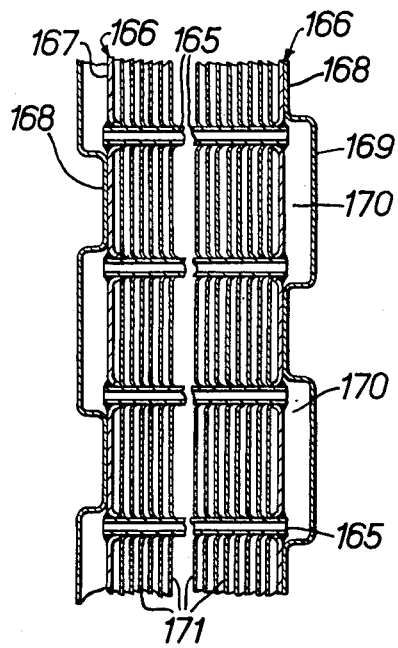

Another preferred construction of heat exchanger is shown in FIGURES 12 and 13. Here flat tubes 165 of sheet metal extend horizontally between end members 166 each formed by a first sheet metal strip 167 through which the ends of the tubes 165 project and a second sheet metal strip 168 having rectangular dished portions 169, the strips being secured together at their edges and intermediate the dished portions. Each dished portion 169 provides with the first strip 167 a connecting space 170 in register with a pair of adjacent tubes 165, the connecting spaces of one end member 166 being staggered with respect to those of the other. Thus refrigerant flows through one tube 165 to (say) a connecting space 170 of the left-hand end member 166 and thence through the next lower tube to the right-hand end member, where it is transferred through a connecting space thereof to the next lower tube to flow leftwards again. Closely spaced corrugated fins 171 similar to the strips 162 of FIGURES 10 and 11 extend normally to the tubes 165 and extend the heat-exchanging area thereof.

The flat tubes 165 provide more effective heat transfer than round tubes would. The end members 166 take up very little space in contrast e.g. to the arrangement of tube bends shown in FIGURES 19 and 20 and hence lead to a more compact unit.

Figure 16:
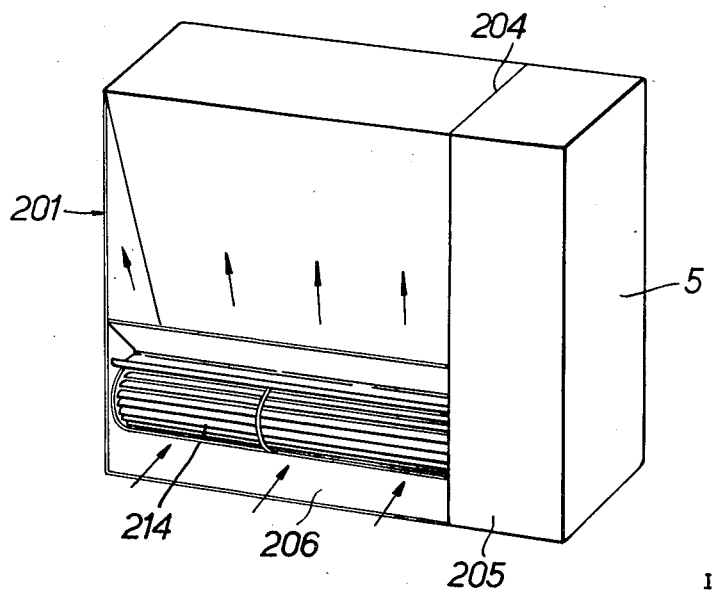
FIGURE 16 is a diagrammatic perspective view of a second form of room air conditioner unit according to the invention, with certain parts removed.
Figure 17:
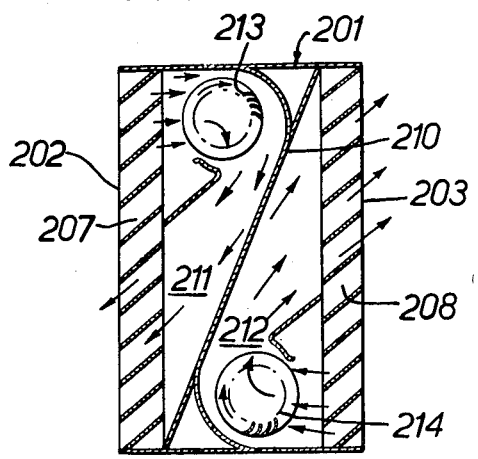
FIGURE 17 is a transverse section, also diagrammatic, of the second unit.
Figure 25:
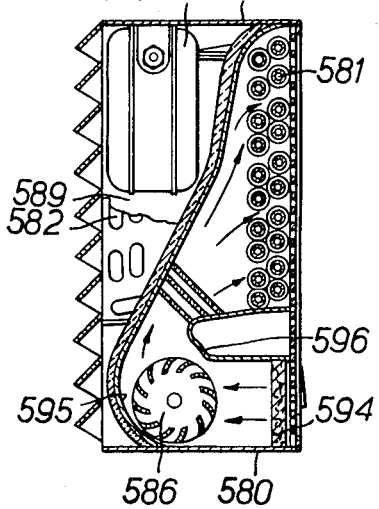
FIGURE 24 and 25 are a further two views corresponding to those of FIGURES 21 and 22 and relating to a fifth room air conditioner unit, the section line of the transverse section being shown at G—H.
Figure 18:
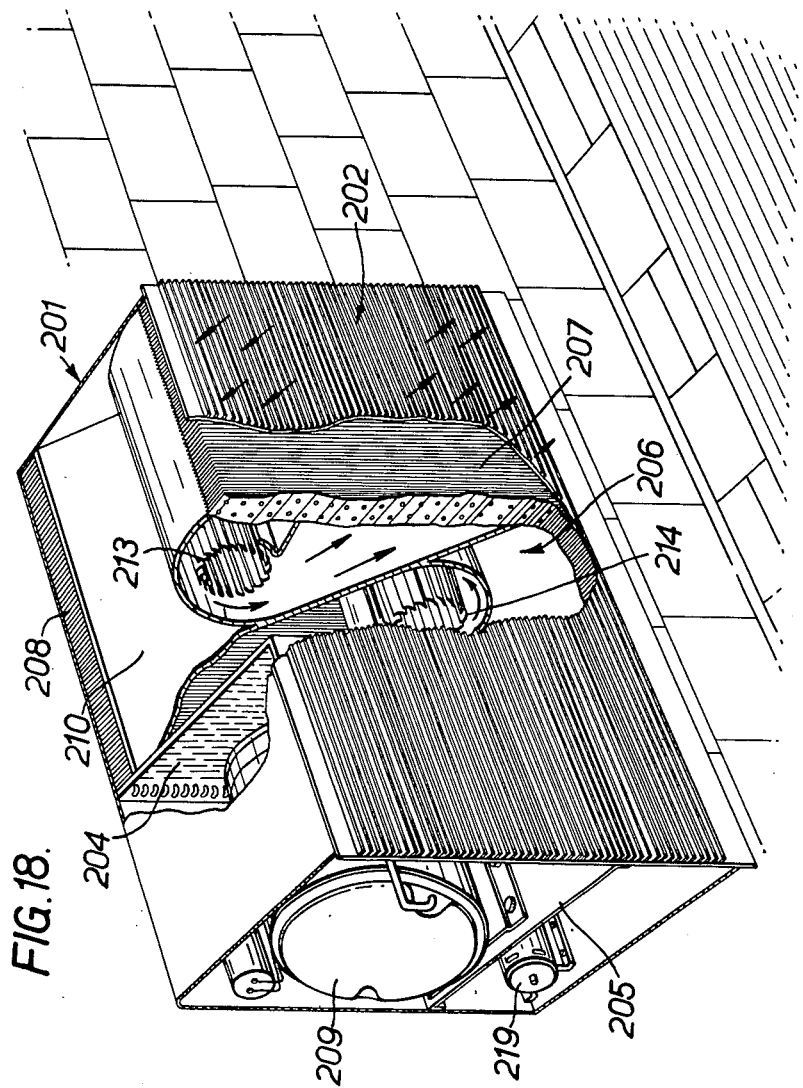
FIGURE 18 is a broken-away perspective view of the second unit installed in the wall of a room.

FIGURES 16 to 18 show a second form of room air conditioner unit somewhat similar to that above described, but considerably simplified in certain respects. Thus no filter is provided; the means illustrated in FIGURES 5, 6 and 14 to improve efficiency at the ends of the rotors are also omitted, and no provision is made for introduction of fresh air. The heat exchangers used are like those shown in FIGURES 19 and 20 rather than as described with reference to FIGURES 10 to 13. Apart from this simplification, however, the second air conditioner unit operates in the same way as the first, and has the same advantages.

Turning now in greater detail to FIGURES 16 to 18, the room air conditioner unit there shown has the form of a rectangular block designated generally 201 with parallel sides 202, 203. The unit is designed to be built into a wall with the side 202 facing into a room and the side 203 facing the exterior. A transverse wall 204 divides the block 201 into a smaller and a larger compartment, which compartments are designated 205, 206 respectively. Rectangular block-like heat exchangers indicated diagrammatically at 207, 208 are disposed in spaced parallel relation one at either side of the block and occupying the greater part of the area of the larger compartment 206. The heat exchangers 207, 208 form respectively the evaporator and the condenser of refrigeration apparatus of the compression type: the compressor 209 and associated parts of the apparatus are accommodated in the smaller compartment 205 of the block 201. Partition walling, designated generally 210, extends substantially diagonally through the height of the block 201 between the heat exchangers 207, 208 and defines therewith a pair of air circulation spaces 211, 212 of more or less triangular shape as seen in section. At the wider end of each circulation space 211, 212 is located a cross-flow fan comprising a cylindrical bladed rotor 213, 214 mounted for rotation about its axis in the direction of the arrow 215, 216, and a guide wall 217, 218 co-operating with the rotor whereby on rotation thereof, by means of a motor 219 in the smaller compartment 205, a stream of air flows in a curved path through the rotor as shown by the arrow 220, 221. The manner in which the rotors 213, 214 co-operate with their respective guide means is more fully described in the foregoing. The rotors 213, 214 extend over the whole length of the respective heat exchangers 207, 208 and in operation cause air to flow in through the heat exchanger over a minor area thereof and out through the heat exchanger over a major area thereof. In this way air from the room is circulated through the heat exchanger 207 and cooled thereby, while air from the exterior is circulated through the condenser 208 to remove heat from it.

Third, fourth and fifth forms of room air conditioner unit are illustrated in the accompanying drawings in FIGURES 19, 20, FIGURES 21 to 23, and FIGURES 24 and 25, respectively. The fourth unit makes use of obliquely extending partition walling like the wall 14 of FIGURES 1 to 15. The fifth unit effects a slight saving of depth at the cost of having the heat exchanger block/blower combinations end to end as opposed to back to back. While the third unit has its heat exchanger block/blower combinations back to back, it foregoes the advantage of depth reduction obtainable by the use of an obliquely extending partition wall such as possessed by the first and second units herein described; by having the rotors side by side it can make use of a double armature motor; while the space between the heat exchanger block/blower combinations can be made to form an acoustic resonator. In the third, fourth and fifth forms of room air conditioner unit the air flows only once through each heat exchanger block.

Turning now in more detail to the third room air conditioner unit shown in FIGURES 19, 20, this unit comprises a rectangular housing 301 divided into a major and a minor compartment 301a, 301b by a transverse wall 301c. Two heat exchanger blocks designated generally 304, 305 are mounted at the broad sides 302, 303 of the major compartment 301a of the housing and extend over the greater part of its area. Each heat exchanger block 304, 305 comprises a tube 304a, 305a mounted to extend to and fro horizontally between a supporting end wall 301d of the housing and the partition 301c, the runs of tube between the wall and partition forming two vertical rows. The tubes 304a, 305a, carry closely spaced radially-extending fins which extend in vertical planes: only the fins 304b on the block 304 are shown on the drawing.

A compressor unit 306 is supported in the minor portion of the housing 301 and includes a compressor in series with the tubes 304a, 305a of the heat exchanger blocks 304, 305, so as to form a refrigerator wherein block 304 forms the evaporator and block 305 the condenser.

A double motor designated generally 308 and comprising a single stator 309 co-operating with armatures of which only one, 309a, is shown mounted in the minor compartment 301b of the housing 301 below the compressor unit 306. This motor 308 drives two cylindrical bladed rotors 312, 313, located at the bottom of the major portion of the housing 301 with their axes extending longitudinally and parallel to one another. Each rotor 312, 313 lies to the inside of one heat exchanger 305, 304 and adjacent to and opposite its bottom side edge 305d, 304d, and extends over the whole length of that edge. Both rotors 312, 313 comprise blades 310, 311 respectively which extend the length of the rotor between supporting end discs 310a, 311a, one of which is supported on the shaft of the corresponding armature and the other of which is journalled in the housing wall 301b. Each of the rotors 312, 313 co-operates with guide walls 314, 317 respectively, extending the length of the rotor and defining therewith a wedge-shaped space converging with the rotor in the direction of rotation thereof. Opposite the guide walls 314, 317 are further walls 315, 316 respectively which diverge from the respective rotors 312, 313 in the direction of rotation thereof and define with the walls 314, 317 the entry and exit arcs of the rotors, the entry arc being in each case about 180°. The rotors 312, 313, on rotation thereof in the direction of rotation indicated by the arrows 310b, 311b, co-operate with the respective guide walls 314, 317 to set up a cylindrical vortex eccentric to the rotor axis having a core region as indicated schematically by the chain-dot line V. By reason of the vortex air is induced to flow twice through the path of the rotating blades of each rotor as indicated by the flow lines F; flow is turned through a substantial angle about the vortex core V. The cross-flow blowers comprising rotors 312, 313 and guide walls 314, 317 operate in the same general manner as the blowers 19, 20 of FIGURES 1 to 15 and will accordingly not require further description.

The evaporator heat exchanger block 304 has its associated rotor 313 wholly below its lower edge 304d, and a line joining its inside upper edge 304e to the rotor axis makes an angle of some 5–10° with the general plane of the block. Ducting comprising a guide wall 327 starting at the upper edge 304e of the block 304 and merging with the guide wall 317 leads air to the entry arc of the rotor 313. This ducting, which includes the end walls, defines with the block 304 a suction zone $S_1$ of generally triangular section leading air from the block to the rotor.

The guide wall 316 merges smoothly with a wall 326 which runs parallel to the wall 327 and behind it to lead air from the rotor 313 to a slot-like outlet opening 322 above the heat exchanger block 304 and extending the whole length thereof.

The condenser heat exchanger block 305 has the axis of its associated rotor 312 about level with its bottom edge 305d, the line joining the upper edge 305e to the rotor axis making an angle of some 15° to the general plane of the block. A guide wall 324 extends from the upper edge 305e of the block, diverges therefrom, and merges with the wall 315. The guide wall 314 is extended to the side 303 of the housing to define, with the bottom 307 thereof into which the wall 315 fairs, a slot-like outlet 323 below the heat exchanger block 305 and extending the whole length thereof. The guide wall 324 and the block 305, together with the end walls, define a suction zone $S_2$ of generally triangular section leading air from the block to the rotor 312 over approximately a semi-cylinder thereof which forms a re-entrant boundry portion of the suction zone.

It will be seen that both rotors 312, 313 suck air through the respective heat exchanger blocks 305, 304, this air twice traversing the path of the rotating blades 310, 311 of the rotors in a curved path normal to its axis and being subsequently discharged through the slot-like outlet 323, 322.

To minimize noise transmission to the room side of the unit the back of the guide wall 324 carries sound-absorbing material 325 and the space 332 between the walls 324, 326 is formed as a resonator tuned to the frequency of the chief noises produced by the apparatus. The walls 326, 327 include portions 328, 329, 330, 331 constructed as thin membranes to allow the resonator 332 to co-operate acoustically with the remainder of the interior of the housing 301.

The housing 301 may be built into a wall, portions of which are shown at 318, 319 in FIGURE 20, the side 302 of the housing facing into the room and the side 303, which is protected against the weather by fixed louvres 320, facing the exterior of the buliding. Heat is therefore rejected to the external air through the heat exchanger block 305 and air is directed horizontally into the room through the outlet 322, this air being cooled in passing through the exchanger block 304.

Figure 21:
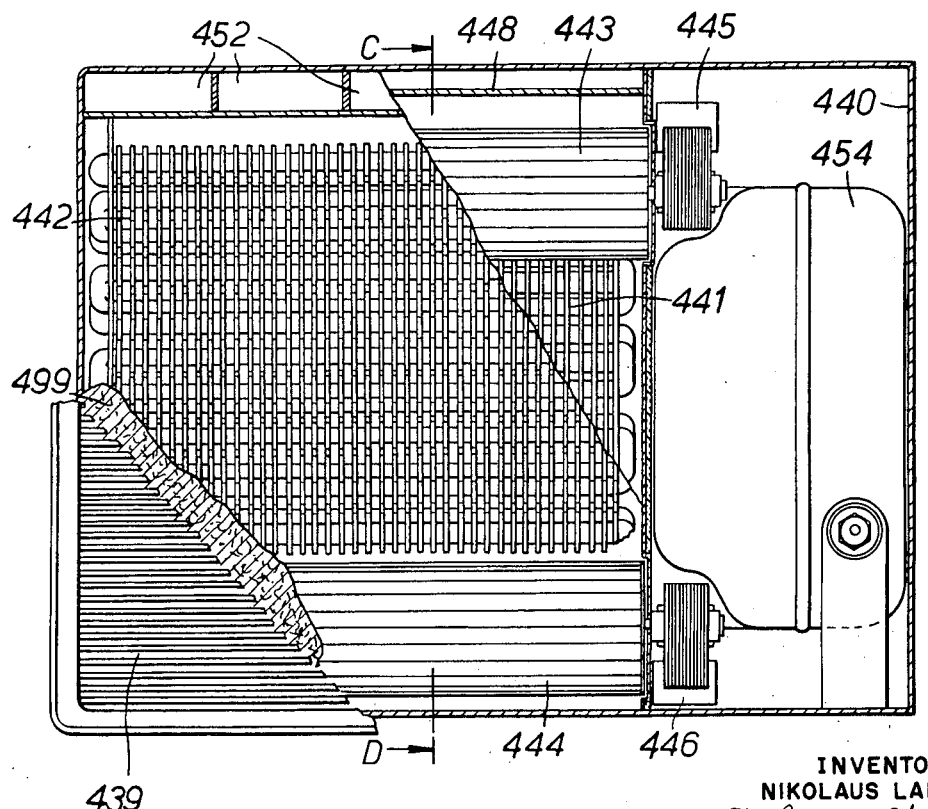
FIGURES 21 and 22 are respectively a longitudinal section with parts cut away and a transverse section of a fourth form of room air conditioner unit, the transverse section being taken on the line C—D of FIGURE 21.
Figure 22:
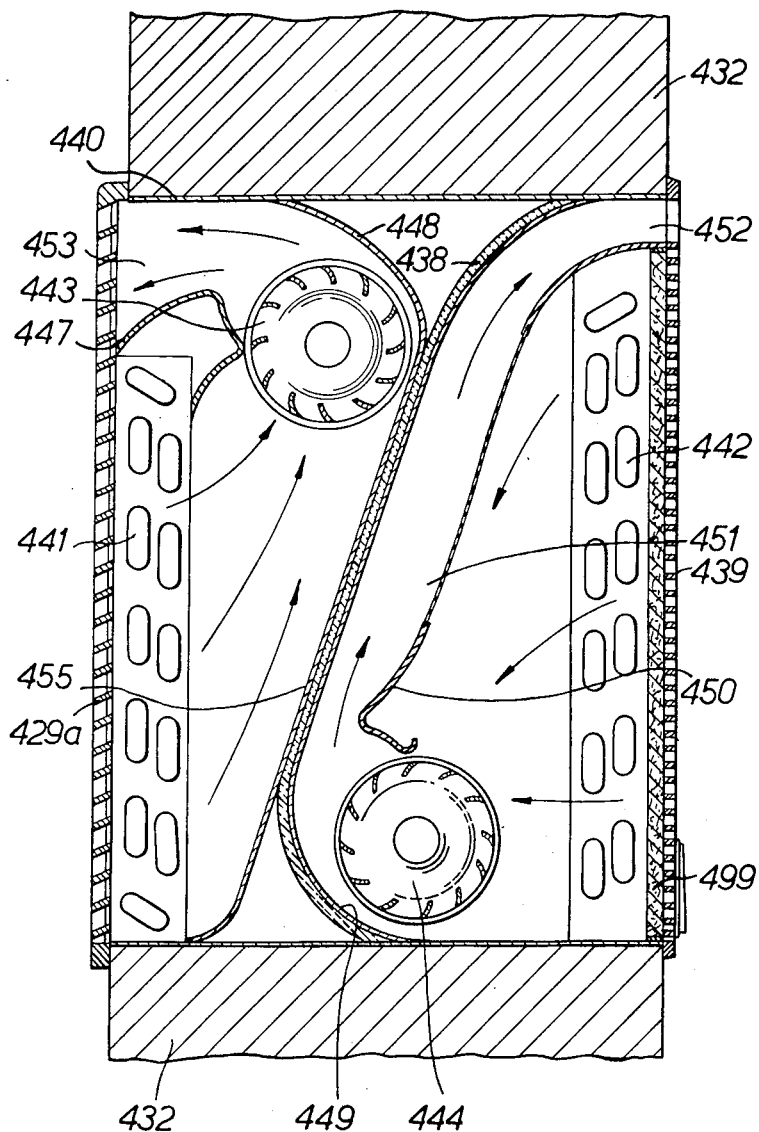
Figure 23:
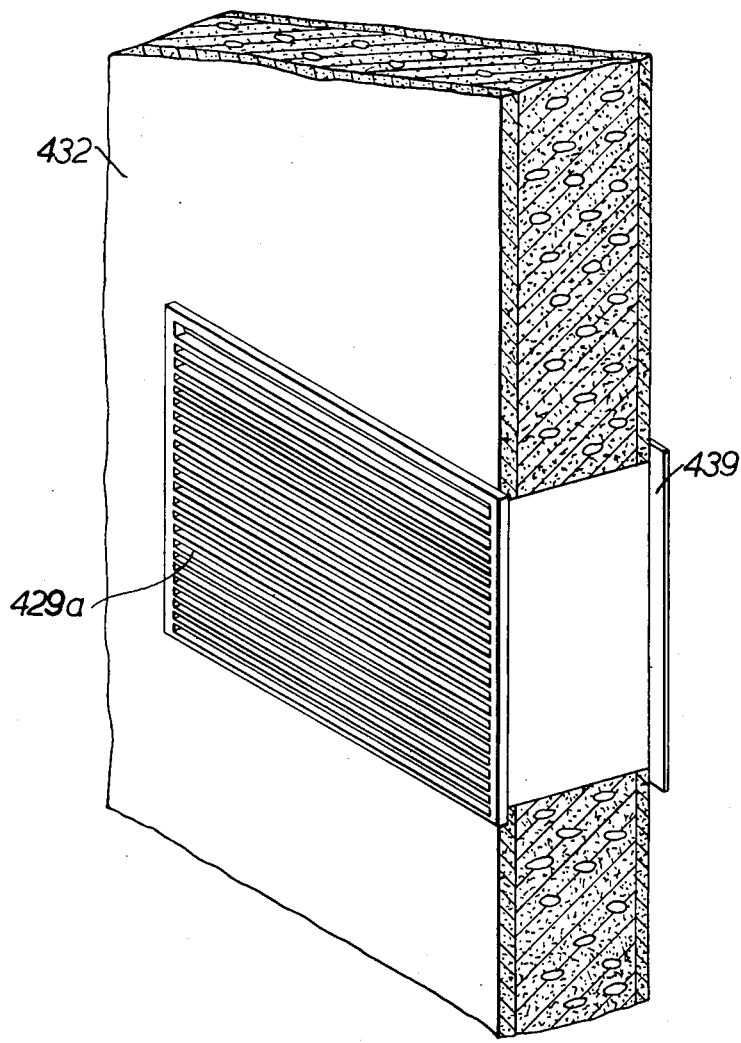
FIGURE 23 is a perspective view partly in section of the fourth air conditioner unit installed in a wall.

The fourth form of room air conditioner unit, shown in FIGURES 21 and 22, comprises a rectangular housing 440 which has a heat exchanger 441 and 442 respectively on each of its broad sides. Each heat exchanger is associated with a blower rotor 443, 444 driven by a separate split pole motor 445, 446. Both rotors 443, 444 are provided with the guide elements 447, 448, 449, 450 co-operating with the rotor as above described with reference to the corresponding elements of FIGURE 1. The air is conveyed through the blowers in the direction indicated by the arrows, so that the air from the room is sucked in through the heat exchanger block 442, which acts as evaporator, and is conveyed through the rotor 444, and through the channel 451, to be returned as cool air through the slot-like outlet 452. On the other side, air from the outside atmosphere is sucked in by the heat exchanger 441, which acts as condenser, passed through the rotor 443, and leaves as warmed air at 453. The two motors 446 and 445 are arranged as far as possible towards top and bottom of the housing and next to the compressor 453, so that they do not take up extra space. The guide wall 455 is covered with a layer of material 438 for absorbing sound. The housing 440 is mounted substantially flush in a wall 432 as shown in FIGURE 23: the weather side of the housing is protected by a fixed grille 429a of horizontal bars adapted to throw the rain off while the evaporator heat exchanger block 442 has a layer of filter medium 499 over its inlet face and clamped thereagainst by a protective grille 439.

In the fifth form of room air conditioner unit shown in FIGURES 24 and 25, there is again a rectangular housing here designated 580, in which the two heat exchangers 581, 582 are arranged endwise on, to make the construction as shallow as possible. The heat exchanger 580 in this example corresponds to the heat exchanger 442 in FIGURE 21, whereas the heat exchanger 582 corresponds to the heat exchanger 411 in FIGURE 21. There is a cross-flow blower for both heat exchangers 581, 582, comprising two coaxial rotors 586, 587 which are driven by a common motor 588 arranged between them and co-operate with guide means 596 in the general manner described with reference to FIGURES 19 and 20.

In this embodiment the air, instead of being sucked through the heat exchanger blocks 581, 582, is blown through them: the general configuration however remains as before. A filter 594 is located over the inlet to the rotor 586 from the room to be cooled, and the whole of this side of the housing 580 is covered by a mesh 590.

The guide wall 595 leading air from the rotor 586 to the heat exchanger 581 carries a sound-absorbing backing and extends very approximately diagonally across the housing: in the roughly triangular space which remains is mounted the compressor 591. A sound-absorbing partition 589 divides off the two circulation spaces.

I claim:
1. A rectangularly-shaped heat exchanger apparatus having an air outlet and an air inlet positioned on the same side of said apparatus, a cross-flow blower having a hollow cylindrical bladed rotor positioned in said apparatus for moving and turning air 180° in said apparatus from said inlet to said outlet and in a direction perpendicular to the longitudinal axis of said apparatus, a rectangularly-shaped heat exchanger block positioned in said apparatus between said inlet and said outlet and to one side of said rotor whereby air will pass through substantially the complete cross-section of said block when said rotor is rotated, ducting including enclosure walls extending perpendicular to the rotor axis and substantially covering the ends of said rotor, and guide means associated with said rotor to guide air passing from said inlet to said outlet through said rotor from the suction side thereof through the path of the rotating blades and out of said rotor to the pressure side thereof through the path of the rotating blades.

2. Apparatus according to claim 1 wherein said block is positioned between the inlet of said apparatus and the suction side of said blower, and said ducting includes a guide wall extending from the suction side of said rotor to the side of said block opposite said rotor whereby air will enter the rotor from the suction side over substantially ½ the circumference thereof.

3. Apparatus according to claim 2 wherein said rotor axis is positioned in a plane extending to the side of said block opposite said rotor and making an angle to a general plane of the block of 5–30°.

4. Apparatus as claimed in claim 1 wherein the guide means includes a vortex former which forms a cylindrical fluid vortex eccentric to the rotor axis to guide air through the rotor in a curved path.

5. An air conditioning unit comprising two rectangularly-shaped heat exchanger apparatus according to claim 1 and having in addition a compressor means co-operating with said heat exchanger blocks wherein one said heat exchanger block acts as a condenser and the other of said heat exchanger blocks acts as an evaporator.

6. A unit as claimed in claim 5 mounted within a rectangular housing with said heat exchanger blocks positioned on opposite sides of said housing.

7. A unit as claimed in claim 6 wherein the housing is divided by a transverse partition into two portions, with one said portion accommodating said heat exchanger blocks and the other said portion accommodating said compressor and a driving means for driving said blowers.

8. An air conditioning unit according to claim 5 wherein said blocks are positioned on opposite sides of said unit and staggered with respect to each other.

9. An air conditioning unit comprising two rectangularly-shaped heat exchanger apparatus according to claim 2 having in addition a compressor means co-operating with the heat exchanger blocks of both apparatus wherein one heat exchanger block of one apparatus acts as a condenser and the heat exchanger block of the other apparatus acts as an evaporator; the blocks being mounted on opposite sides of said unit wherein the guide wall of one said apparatus is spaced opposite the guide wall of the other said apparatus and wherein the space between said guide walls defines an acoustic resonator.

10. A heat exchanger apparatus comprising a casing presenting at one side a rectangular inlet area and a rectangular outlet area, said areas being substantially coplanar and having the same width, the height of the inlet area being substantially greater than the height of the outlet area; a rectangular heat exchanger block located at said inlet and extending over the whole area thereof; and a cross-flow blower within the casing and having a hollow cylindrical bladed rotor with the length of the rotor being equal to the width of said areas, said blower further comprising guide means co-operating with said rotor to guide air passing from said inlet to said outlet through the rotor from the suction side thereof through the path of the rotating blades and out of the rotor to the pressure side thereof through the path of the rotating blades, the air changing direction by an angle substantially exceeding 90° in passing through the rotor.

11. A heat exchanger apparatus comprising a casing presenting at one side a rectangular inlet area and a rectangular outlet area, said areas having the same width and occupying substantially the whole height of the casing, the height of the inlet area being substantially greater than the outlet area; a rectangular heat exchanger block located at said inlet and extending over the whole area thereof; and a cross-flow blower within the casing and having a hollow cylindrical bladed rotor positioned substantially opposite the outlet area, the rotor being equal in length to the width of said area; the blower further comprising guide means co-operating with the rotor to guide air passing from said inlet to said outlet through the rotor from the suction side thereof through the path of the rotating blades and out of the rotor to the pressure side thereof through the path of the rotating blades, said guide means including a wall of the casing extending around one side of the rotor to said outlet and defining one extreme edge of said areas and a wall extending from adjacent the opposite side of the rotor to the junction of said areas, the air changing direction by an angle substantially exceeding 90° in passing through said rotor and discharging directly from the rotor through said outlet without substantial further change in direction.

12. Heat exchange apparatus comprising enclosure means including end walls and a rear wall joining said end walls, said means defining a chamber and an inlet and an outlet both inlet and outlet being situated at the front of the apparatus, a rectangular heat exchanger block between the end walls, and a cross-flow blower within the chamber and comprising a cylindrical bladed rotor mounted between the end walls for rotation about an axis parallel to and adjacent one side edge of the heat exchanger block and guide means co-operating with the rotor on rotation thereof to induce a flow of air from a suction side of the rotor through the path of the rotating blades to the interior of the rotor and thence again through the path of the rotating blades to a pressure side of the rotor and to turn the flow through an angle exceeding 90° between said suction and pressure sides the blower thereby moving air through said chamber between said inlet and said outlet and through the heat exchanger block over substantially its whole area.

13. Heat exchange apparatus as claimed in claim 12 wherein the rear wall defines with one face of the heat exchanger block a substantially triangular air circulation space, as seen in section perpendicular to said face, and the rotor is situated in the larger part of said space.

14. Heat exchange apparatus as claimed in claim 13 wherein the rear wall is curved about said rotor and provides part of the guide means therefor.

15. Heat exchange apparatus comprising a rectangular heat exchanger block, enclosure means defining an air circulation space over one face of the block, said enclosure means comprising end walls substantially aligned with opposite ends of the block and a rear wall extending between the end walls and between opposite side edges of the block, a cross-flow blower in said air circulation space, said blower comprising a cylindrical bladed rotor mounted between the end walls with its axis parallel to one side edge of the block and flow guide means dividing the area of the heat exchanger block into an inlet part and an outlet part along a dividing line parallel to said side edge the guide means also co-operating with the rotor on rotation thereof to induce a flow of air through said inlet part of the heat exchanger block to a suction side of the rotor, through the path of the rotating blades thereof to the interior of the rotor, again through the path of the rotating blades to a pressure side of the rotor and thence through the outlet part of the heat exchanger block.

16. Heat exchange apparatus as claimed in claim 15 wherein the air circulation space has a substantially triangular shape as seen in section transverse to the heat exchanger block, and the rotor is situated in the larger part of the space.

17. Heat exchange apparatus as claimed in claim 16 wherein the air circulation space has substantially the shape of a right angled triangle of less than 30° apical angle with the rear wall forming hypotenuse and base of the triangle and the heat exchanger the remaining side.

18. Heat exchange apparatus as claimed in claim 17 wherein the rear wall includes a curved portion where the hypotenuse and base of said triangle merge, the curved wall portion embracing the rotor.

19. Heat exchange apparatus as claimed in claim 15 wherein the guide means includes a guide wall extending between the end walls from the heat exchanger at said dividing line up to a position adjacent the rotor.

20. Heat exchange apparatus as claimed in claim 19 wherein the guide means and rotor co-operate to set up a vortex having a core region extending parallel to the rotor axis and interpenetrating the path of the rotating blades adjacent said guide wall.

21. Heat exchange apparatus comprising enclosure means including end walls and a rear wall joining said end walls, said means defining a chamber and an inlet and an outlet both inlet and outlet being situated at the front of the apparatus, a cross-flow blower in said chamber having a rotatably mounted cylindrical bladed rotor extending between the end walls and guide means co-operating with the rotor on rotation thereof to set up a flow from inlet to outlet and twice through the path of the rotating blades of the rotor, the blower turning the flow through an angle exceeding 90° on passage through the rotor, and a rectangular heat exchanger block extending between the end walls and positioned to be traversed by said air flow.

22. Heat exchange apparatus as claimed in claim 21 wherein the heat exchanger block is positioned for air flow from the inlet through an area thereof to said blower and for air flow from the blower through the remaining area of the heat exchanger to the outlet, the heat exchanger block being twice traversed by the air flow in its passage between inlet and outlet.

23. Heat exchange apparatus as claimed in claim 22 wherein the area of the heat exchanger block traversed by air passing from the inlet to said blower is substantially equal to the area of the block traversed by air passing from the blower to the outlet.

24. Heat exchange apparatus as claimed in claim 21, wherein said inlet and outlet are constituted by areas of said heat exchanger block, the heat exchanger block being twice traversed by the air on its passage between inlet and outlet.

25. Heat exchange apparatus as claimed in claim 21 wherein said inlet is spaced forwardly of the heat exchanger and said enclosure means includes means to hold air filter medium over the area of the inlet and in spaced relation to the heat exchanger block whereby to define an air inlet space on the upstream side thereof, the area of the inlet being greater than the area of the heat exchanger traversed by the air in passing to the blower from the inlet.

26. Heat exchange apparatus as claimed in claim 21 wherein the outlet is spaced forwardly of the heat exchanger, the area of the outlet being smaller than the area of the heat exchanger traversed by the air in passing from the blower to the outlet.

27. Heat exchange apparatus as claimed in claim 21 wherein the heat exchanger has a multiplicity of closely spaced fins extending across its area the fins being corrugated lengthwise.

28. Heat exchange apparatus as claimed in claim 21 wherein the heat exchanger comprises a plurality of parallel flat tubes extending between end members each connecting adjacent pairs of tubes for flow through the tubes in series, each end member comprising a pair of sheet metal members secured face to face with pairs of adjacent tube ends extending through one said member in register with a dished area of the other said member, the members providing at said dished area a space interconnecting the tubes.

29. A room air conditioner unit in the shape of a block and having a pair of opposite sides to face one towards the room and the other towards the exterior, the unit comprising refrigeration apparatus having a pair of rectangular heat exchanger blocks disposed in spaced and substantially parallel relation one adjacent either of said sides and forming evaporator at the room side and condenser at the exterior side respectively, partition walling extending obliquely through the height of the unit between the heat exchanger blocks and defining with each an air circulation space wider adjacent one edge of the heat exchanger block than adjacent the opposite edge thereof, the wider part of one circulation space being adjacent the narrower part of the other circulation space, a cross-flow blower in the wider part of each circulation space to drive air through the associated heat exchanger block each such blower including a bladed cylindrical rotor mounted with its axis parallel to the adjacent edge of the block and extending over the greater part of its length and guide means co-operating with the rotor to induce a flow of air twice through the path of the rotating blades of the rotor in planes transverse to the axis thereof.

30. A room air conditioner unit as claimed in claim 29 wherein one of said rotors is directly driven by an electric motor and the other rotor is driven from said motor with the aid of a belt.

31. A room air conditioner unit as claimed in claim 30 wherein the belt runs through a sump receiving condensed water from the evaporator and over a pulley connected to the upper rotor, and means are provided to collect water lifted from the sump by said belt and thrown off as it passes over the pulley and to convey said water to the circulation space associated with the condenser heat exchanger block.

32. A room air conditioner unit as claimed in claim 29, wherein the rotor in the air circulation space on the room side is driven at a slower speed than the other rotor.

33. A room air conditioner unit in the shape of a block and having a pair of opposite sides to face one towards the room and the other towards the exterior, the unit comprising refrigeration apparatus having a pair of rectangular heat exchanger blocks disposed in spaced and substantially parallel relation one adjacent either of said sides and extending over the height thereof and forming evaporator and condenser respectively, partition walling extending obliquely through the height of the unit between the heat exchanger blocks and defining with each an air circulation space wider adjacent one edge of the heat exchanger block than adjacent the opposite edge thereof, the wider part of one circulation space being adjacent the narrower part of the other circulation space, a cross-flow blower in the wider part of each circulation space each such blower including a bladed cylindrical rotor mounted with its axis parallel to the adjacent edge of the block and extending over the greater part of its length, means dividing the total area of each heat exchanger block, along a line running lengthwise across it, into an inlet area and an outlet area, each blower setting up a flow of air through the inlet area of the associated heat exchanger block into the circulation space and from the circulation space through the outlet area of said heat exchanger block.

34. A room air conditioner unit as claimed in claim 33 wherein means are provided on the room side of the unit to mount an air filter adjacent and in spaced relation to the inlet area of the heat exchanger block forming the evaporator, the air filter being larger in area than said inlet area, said means also defining an outlet smaller in area than the outlet area of said heat exchanger block and an outlet space leading therefrom to said outlet and wherein air flow leaving the heat exchanger block is accelerated.

35. A room air conditioner unit as claimed in claim 33 wherein said inlet and outlet areas of the heat exchanger blocks are equal.

36. A room air conditioner unit in the shape of a block and having a pair of opposite sides to face one towards the room and the other towards the exterior, the unit including a casing having top and bottom and end walls and a transverse partition dividing the unit into a larger and a smaller compartment, refrigeration apparatus including a compressor in the smaller compartment and rectangular heat exchanger blocks in the larger compartment one adjacent either side of the unit and forming evaporator at the room side and condenser at the exterior side, walling extending in the larger compartment through the height of the unit between said heat exchanger blocks and defining with each an air circulation space, a cross-flow blower in each circulation space to drive air through the associated heat exchanger blocks, each such blower including a bladed cylindrical rotor mounted with its axis parallel to the adjacent edge of the block and extending over the greater part of its length and guide means cooperating with the rotor to induce a flow of air twice through the path of the rotating blades of the rotor in planes transverse to the axis thereof, and driving means for the rotors situated in the smaller compartment.

37. A room air conditioner unit as claimed in claim 36 wherein a wall at the room side of the smaller compartment, said transverse wall and said walling in the larger compartment together provide sound insulation to prevent noises reaching the room side of the unit from the exterior, from the smaller compartment, or from said air circulation space at the exterior side of the unit.

38. A room air conditioner unit as claimed in claim 36 wherein a duct for fresh air leads from the exterior side of the smaller compartment and through the smaller compartment and debouches in the air circulation space on the room side of the unit on the suction side of the blower therein.

39. A room air conditioner unit as claimed in claim 36 including an extractor fan in said smaller compartment which discharges to the exterior, and duct means to effect suction by said fan from either end of each rotor adjacent regions of low static pressure therein.

References Cited by the Examiner

UNITED STATES PATENTS

| | | | |
|---|---|---|---|
| 507,445 | 10/93 | Mortier | 230—125 |
| 2,112,870 | 4/38 | Weiland | 62—429 |
| 2,289,035 | 7/42 | Neeson | 62—428 |
| 2,780,929 | 2/57 | Roseman | 62—429 |
| 2,942,773 | 6/60 | Eck | 230—125 |
| 3,035,760 | 5/62 | Simmons | 230—125 |
| 3,123,987 | 3/64 | Moore | 62—426 |

WILLIAM J. WYE, *Primary Examiner.*

ROBERT A. O'LEARY, *Examiner.*